(12) United States Patent
Zave et al.

(10) Patent No.: US 6,778,560 B1
(45) Date of Patent: Aug. 17, 2004

(54) SIGNALING/MEDIA SEPARATION FOR TELECOMMUNICATION NETWORK SYSTEM AND METHOD

(75) Inventors: Pamela Zave, Chatham, NJ (US); Michael A Jackson, London (GB); Eric Cheung, New York, NY (US)

(73) Assignee: AT&T Corp., New York, NY (US)

(*) Notice: Subject to any disclaimer, the term of this patent is extended or adjusted under 35 U.S.C. 154(b) by 741 days.

(21) Appl. No.: 09/716,102

(22) Filed: Nov. 17, 2000

Related U.S. Application Data (60) Provisional application No. 60/166,563, filed on Nov. 19, 1999, provisional application No. 60/199,089, filed on Apr. 21, 2000, and provisional application No. 60/204,334, filed on May 15, 2000.

(51) Int. Cl.[7] ............................................. H04J 3/12
(52) U.S. Cl. .................. 370/522; 370/410; 370/469; 379/201.01; 455/414.1
(58) Field of Search ........................ 370/522, 524, 370/493, 496, 229, 236, 259, 401, 410, 465–467, 468, 469, 477, 241, 242, 352; 379/201.01, 207.01, 207.02, 210.01, 210.02, 215.01, 229–230; 455/414.1, 403, 405

(56) References Cited

U.S. PATENT DOCUMENTS

| | | | |
|---|---|---|---|
| 5,680,437 A | * 10/1997 | Segal | 379/15.01 |
| 6,160,883 A | * 12/2000 | Jackson et al. | 379/230 |
| 6,353,610 B1 | * 3/2002 | Bhattacharya et al. | 370/352 |
| 6,418,205 B2 | * 7/2002 | Capers et al. | 379/112.01 |
| 6,658,022 B1 | * 12/2003 | West et al. | 370/467 |

* cited by examiner

Primary Examiner—Brian Nguyen (57) ABSTRACT

It is an object of the present invention to provide a general-purpose media layer for a distributed feature system. In accordance with an embodiment of the present invention, a distributed feature system environment is disclosed in which paths carrying media, e.g. voice or text, are fully separated from signaling paths. A plurality of media processing components are utilized to establish media channels separate from signaling channels and wherein each media processing component is assigned to one or more feature components in the distributed feature system.

7 Claims, 9 Drawing Sheets

SIGNALING/MEDIA SEPARATION FOR TELECOMMUNICATION NETWORK SYSTEM AND METHOD

CROSS REFERENCE TO RELATED APPLICATIONS

This application claims priority to Provisional Applications "DFC: Signaling and Media Extensions," Serial No. 60/166,563, filed on Nov. 19, 1999; "Eclipse: Software Architecture for Next Generation Telecommunications," Serial No. 60/199,089, filed on Apr. 21, 2000; "New Feature Interactions in Mobile and Multimedia Telecommunication Services," Serial No. 60/204,334, filed on May 15, 2000, the contents of which are incorporated by reference herein.

This application is related to Utility Applications, "Telecommunication Network System and Method," Serial No. 09/034,681, filed on Mar. 4, 1998 now U.S. Pat. No. 6,160,883; "Routing Extensions For Telecommunications Network System And Method," Ser. No. 09/644,128, filed Aug. 23, 2000; "Protocol Extensions For Telecommunications Network Systems and Method," Serial No. 09/644,461, filed Aug. 23, 2000; which are incorporated by reference herein.

FIELD OF THE INVENTION

The invention relates to telecommunications networks, and more particularly to advanced architectures for the description of telecommunication services.

BACKGROUND OF THE INVENTION

The feature-interaction problem arises from the incremental, feature-by-feature, extension of telecommunications system functionality. As new features such as call forwarding, call waiting, or three-way calling have been added to telecommunication systems, it has become increasingly difficult to manage the behavioral complexity of the features and their interactions. Redesign of old features to fit smoothly with the new features is scarcely ever a practical option. Eventually, the resulting complexity damages the quality and productivity of all phases of telecommunication software development.

In the U.S. Pat. No. 6,160,883 "Telecommunication System and Method," filed on Mar. 4, 1998, which is incorporated by reference herein, the inventors introduced an architecture for managing the feature-interaction problem. The inventors presented a virtual architecture for telecommunication systems, which they called distributed feature composition (DFC), in which a feature corresponds to a component type; each telephone call is handled by building a configuration of instances of these components, according to the features to be applied to that particular call. The feature component instances communicate by featureless internal calls that are connected by the underlying architectural substrate. A new feature is specified by describing its corresponding component type (or occasionally, two component types) and the rules for including the component instances into configurations. In the pending utility applications, "Routing Extensions For Telecommunications Network System And Method," Ser. No. 09/644,128, filed Aug. 23, 2000, and "Protocol Extensions For Telecommunications Network Systems and Method," Ser. No. 09/644,461, filed Aug. 23, 2000, which are incorporated by reference herein, the inventors enhanced and modified DFC to accommodate open telecommunication systems, mobile telecommunication users, multimedia telecommunication services, unified messaging, and other aspects of modern telecommunication systems and services.

In distributed feature systems like DFC, all feature logic, including the feature logic that controls media switching and processing, is distributed across a dynamic assembly of feature boxes for purposes of modularity. Media switching and processing, however, pose a problem. It is difficult to implement directly at the feature box the media switching and processing mandated by each feature box, for at least two reasons: (1) the media would often be traveling by long, inefficient paths, and (2) media transport would be far too fragmented. Accordingly, there is a need in the prior art for a distributed feature system that avoids tightly coupling the signaling and media processing.

SUMMARY OF THE INVENTION

It is an object of the present invention to provide a general-purpose media layer for a distributed feature system. It is an object of the present invention that the media aspects of a feature not compromise feature modularity—and be as distributable as the signaling aspects of the feature. Resource configurations, allocation strategies, and optimizations will evolve continually over time. It is advantageous for such resource changes to not require changes to features already installed in the network—not even recompilations. It is an object of the present invention that inter-node bandwidth be utilized efficiently. The post-dial setup delay for a customer "call" should be minimized. It is an object of the present invention that different media be synchronized within reasonable tolerances. It is an object of the present invention that fault tolerance, providing a level of reliability suitable for telecommunications, cover both signaling and media layers.

In accordance with an embodiment of the present invention, a distributed feature system environment is disclosed in which paths carrying media, e.g. voice or text, are fully separated from signaling paths. A plurality of media processing modules are utilized to establish media channels separate from signaling channels and wherein each media processing module is assigned to one or more feature modules in the distributed feature system. In a preferred embodiment of the present invention, each media processing module further comprises interfaces to feature modules of the distributed feature system and to other media processing modules and an engine which models processing connections of its assigned feature components. The separation of the media and signaling layers may be optimized by allowing certain feature modules to behave transparently with respect to a media channel.

These and other aspects and advantages of the invention will be apparent to those of ordinary skill in the art by reference to the following detailed description and the accompanying drawings.

DETAILED DESCRIPTION

Figure 1:
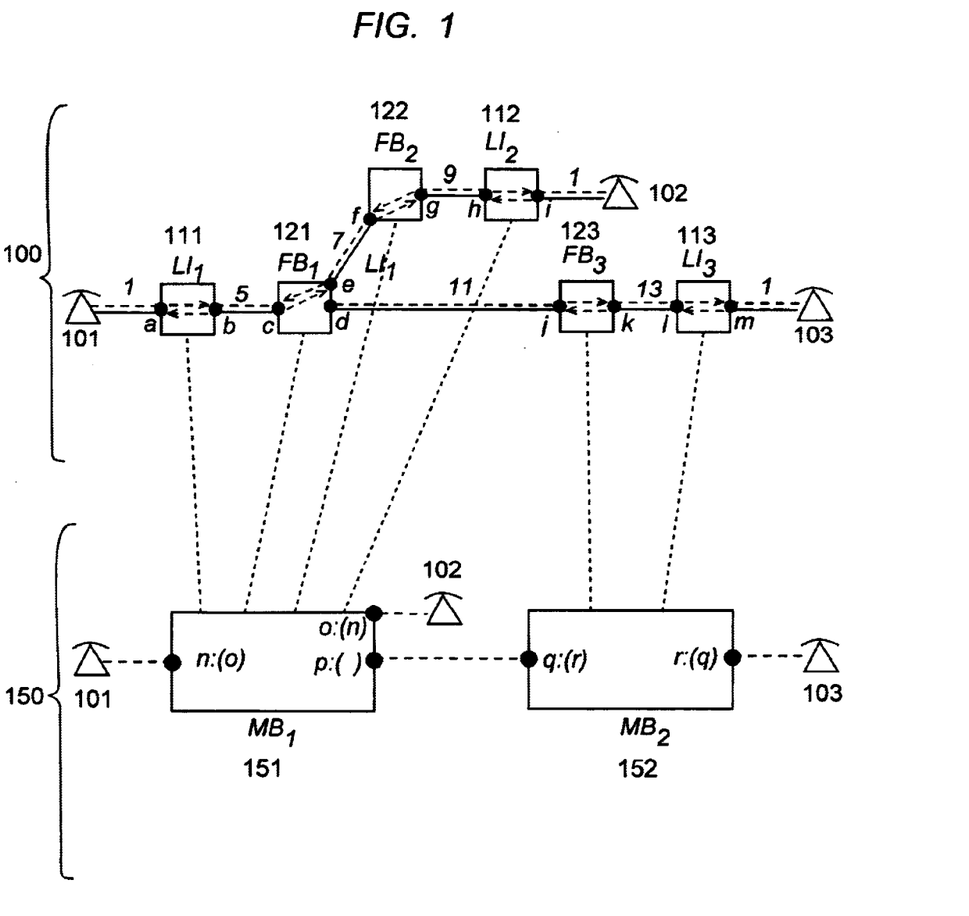
FIG. 1 is an abstract diagram of a usage in a distributed feature system as reflected in a signaling and media layer.

A general approach to signaling/media separation as implemented in the DFC architecture, in accordance with a preferred embodiment of the present invention, is described herein. FIG. 1 sets forth an abstract diagram of a DFC usage, illustrating various aspects of the present invention. The diagram is separated into a signaling layer 100 and a media layer 150. The same communication devices, 101, 102, and 103, are shown in both layers. For purposes of this detailed description, an implementation of only one medium is set forth. It is assumed, at least conceptually, that the implementation of each medium is separate. Note, however, that nothing prevents the implementation of two distinct media from sharing hardware or even software, provided that the software distinguishes between the two.

As further described in the above-referenced co-pending utility applications, the signaling aspects of a feature are implemented by execution of feature "box" programs, for example boxes 111, 112, 113, 121, 122, and 123 in FIG. 1. The software can be advantageously object-oriented, e.g. each instance of a box program being a software object. Each object can resides at a network node where it was created. It is assumed that any object can send a signal to another object, provided the sender has the receiver's object address. This capability can be utilized to implement communication between the signaling 100 and media 150 layers—as well as within the media layer 150. As further described in the co-pending applications, the two ports of an "internal call" can both attempt to open a media channel within that call at approximately the same time. If both choose the same channel identifier, then there is channel glare, and one of the open attempts must fail. The possibility of channel glare may be eliminated by means of a convention. For example, a DFC internal call always has a caller port and a callee port; the caller port may be forced to choose odd channel identifiers, while the callee port must choose even channel identifiers. Another convention can be utilized to prohibit the re-use of a channel identifier within a DFC internal call. Once a call has included the opening and closing of a channel c, it cannot include another open signal with identifier c. This convention prevents race conditions between old and new uses of c.

Since any given program can be run practically anywhere in the network, its location can be chosen freely in response to considerations such as efficiency and ownership. The media aspects of a feature need to be equally distributable. It is advantageous for it to be possible to implement them anywhere in the network, even separated from the box-program execution that is controlling them. The media implementation components are referred to herein as "media switches." Media switches have ports and can be assigned the ability to switch, replicate, mute, and sum the media streams through those ports. A media switch can implement all of the internal media-processing capabilities of a feature box in a distributed feature system such as DFC.

In DFC a call can have any number of bi-directional channels carrying a medium (including none). A DFC system can offer any number of media, e.g. voice, video, text, images, audio, etc. Each medium is distinct and universal, in the sense that any sink for the medium can accept input from any source of the medium. Each channel has an identifier and two "channel terminations," one at each port of the call. A channel termination is identified by a (port,channel-identifier) pair. In addition to the normal box ports of DFC, which are now referred to as "internal ports," each interface box is regarded as having at least one "external port." An external port is the place where a line, trunk, or resource joins the interface box. External ports enable us to specify media processing within interface boxes. Just as ports can now be internal or external, so can channels. An "external channel" is a media channel between an external port and a device, resource, or separate network. An external channel has only one fully identified channel termination; its other termination (at a device, resource, or separate network) has only a channel identifier, and is considered "anonymous" here.

The media-processing state of a box can be formalized as a set of links. Each link is a unidirectional media connection between two channel terminations; the channel terminations must have distinct ports on the same box. The links whose sink is a channel termination (p, c) specify those channel terminations at other ports of the same box whose media streams arriving as input to the box are to be summed and sent as output from the box at the channel termination (p, c). For example, consider a box with ports $p_1$, $p_2$, and $p_3$ at which voice channels $c_1$, $c_2$, and $c_3$ respectively are open. The set of links $$\{(((p_2, c_2), (p_1,c_1)), ((p_3, c_3), (p_1, c_1)), ((p_1, c_1), (p_2, c_2))\}$$

specifies that the output from $(p_1, c_1)$ is the sum of the inputs at $(p_2, c_2)$ and $(p_3, c_3)$, the output at $(p_2, c_2)$ is just the input at $(p_1, c_1)$, and there is no output at $(p_3, c_3)$. Thus $(p_1, c_1)$ and $(p_2, c_2)$ have two-way voice communication; $(p_1, c_1)$ can also hear $(p_3, c_3)$, while $(p_3, c_3)$ can hear nothing.

Henceforth pieces of DFC usages in the signaling layer will be referred to as Dboxes, Dports, Dlinks, Dchannels, and Dcalls. The "D-" prefix distinguishes them from pieces of the media layer with similar names and functions. FIG. 1 shows the Dchannels and Dlinks in a DFC usage. A Dchannel is a dashed line following a call or external line, labeled with a channel identifier. A Dlink is a dashed arrow within a box.

In the media layer, each media switch is encapsulated in a software component called an "Mbox." The ports of the media switch are called Mports, and the bidirectional media connections between Mports of different Mboxes are named Mcalls. Usually we make no distinction between an Mbox and its media switch, as the meaning is clear from context. For the medium whose implementation is being describing, each Dbox is given at the time of its creation the address of an Mbox of that medium. The assigned Mbox implements all of the Dbox's processing of that medium. The Mbox assignment does not change during the lifetime of the Dbox. The dotted lines in FIG. 1 show the signaling connections between the Dboxes and the Mboxes assigned to do their media processing.

In addition to a media switch, an Mbox also includes a controller and a model. The controller receives and responds to commands from Dboxes. The model is a representation of the current media-processing states of all the Dboxes to which this Mbox has been assigned. The model contains representations of Dchannels and Dlinks, which have been created by the controller in response to Dbox commands indicating which Dchannels and Dlinks currently exist.

In addition to maintaining its model, a controller performs three functions:

If a Dchannel connects two Dboxes with different Mboxes, then the Dchannel appears in the models of both Mboxes, and its implementation requires an Mcall between the two Mboxes. The controllers of the two Mboxes cooperate in creating and destroying the Mcalls required by their models. For example, in FIG. 1 the Dchannel between (d, 11) and (j, 11) is implemented using an Mcall between Mports p and q of Mboxes $MB_1$ and $MB_2$, respectively.

At any instant, the media output at an Mport should be the sum of the inputs from some set of other Mports of the same Mbox. This set can be computed from the Mbox's model. It is the responsibility of the controller to keep this computation updated at all times for all Mports, and to control the media switch so that the actual outputs match the computed values. For example, in FIG. 1 all Mports are labeled with the correct output sets.

The implementation of external Dchannels requires Mcalls, for example the Mcalls from Mports n, o, and r in FIG. 1. From the perspective of DFC and the model that reflects DFC, external Dchannels are opened at provisioning time and are persistent thereafter. From the perspective of the implementation, on the other hand, the Mcalls implementing them might be intermittent. It is the responsibility of the controller to bridge this gap by gathering and storing all the necessary information about an external Dchannel at provisioning time, and maintaining a corresponding Mcall at least when it is needed.

There are a number of advantages of the above approach. There is no required relationship of any kind between the configurations of Dboxes and Mboxes, either in number or location. Fewer Mboxes are usually better than more Mboxes, and it is usually best to give a Dbox an Mbox in the Dbox's own network node. But there are many good reasons for exceptions to these heuristics, and the implementors should retain all degrees of freedom. The Dbox programming interface to the media layer is determined only by DFC and the philosophy described below with respect to fault tolerance. It does not depend on other, less stable, characteristics such as allocation and optimization strategies (which should be implemented primarily in the media layer). The interface should remain unchanged as these strategies evolve, which would mean that box programs can also remain unchanged. Inevitably Mboxes must execute distributed algorithms to carry out the intentions of the signaling layer. There is a potential for very complex algorithms that are difficult to understand and verify. Initially, at least, this approach requires nothing more complex than cooperation between two Mboxes to create and destroy an individual Mcall. For all portions of a DFC usage whose Dboxes have the same Mbox, media processing is centralized and optimal.

A. Mbox Model Content

Figure 2:
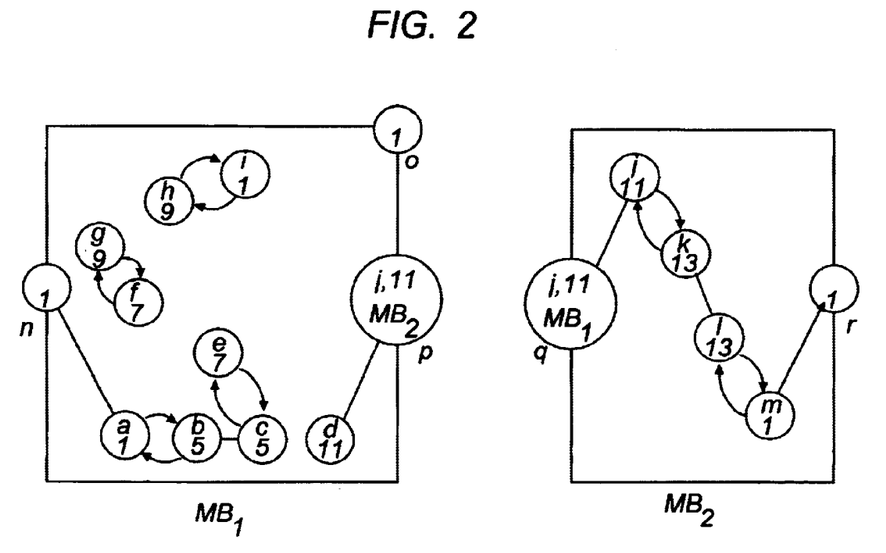
FIG. 2 illustrates a model for the usage shown in FIG. 1, in accordance with a preferred embodiment of the present invention. Mport allocations (n, o, p, q, r) are given to elucidate the correspondence to FIG. 1.

A model in an Mbox is a dynamic graph. FIG. 2 is an expansion of the bottom part of FIG. 1, showing the models within the Mboxes. FIG. 2 shows Mboxes in the media layer containing models. Mport allocations (n, o, p, q, r) are given to elucidate the correspondence to FIG. 1. Nodes in the graph represent Dchannel terminations. A node on the border of the model has been allocated an Mport, while a node in the interior has not. There are two types of edge: a plain line represents a Dchannel, while an arrow represents a Dlink.

Depending on the assignment of Mboxes to Dboxes, there are two types of internal Dchannel:

A Dchannel connecting two Dboxes, both of which have the same Mbox, for example the Dchannel between (b,5) and (c,5). The Dchannel appears in that Mbox's model. Neither of its Dchannel terminations lies on the border of the model.

A Dchannel connecting two Dboxes, each of which has a different Mbox, for example the Dchannel between (d, 11) and (j, 11). The Dchannel appears in the models of both Mboxes. In each model, the remote Dchannel termination (the one whose Dbox has a different Mbox) is on the border of the model and has an Mport allocated to it. The remote Mbox is recorded in the border node's label. The Dchannel is implemented with the help of an Mcall between the two Mboxes, joining the Mports allocated to the border nodes.

The models related to a particular medium are a projection of the current DFC usages onto that medium alone. This projection leaves out some important information, as mentioned above, most notably which Dports belong to which Dboxes. Nevertheless, the structures of the usages are still faintly visible in constraints on how models can be formed:

A Dchannel termination can touch at most one Dchannel.

The two terminations of a Dchannel must have distinct ports.

The two terminations of a Dlink must have distinct ports.

There cannot be a Dlink and a Dchannel joining the same two Dchannel terminations.

A constraint can be imposed on models to ensure that there is no redundancy and no leftover garbage:

At least one of the two Dchannel terminations of a Dlink must be touching a Dchannel.

Figure 3:
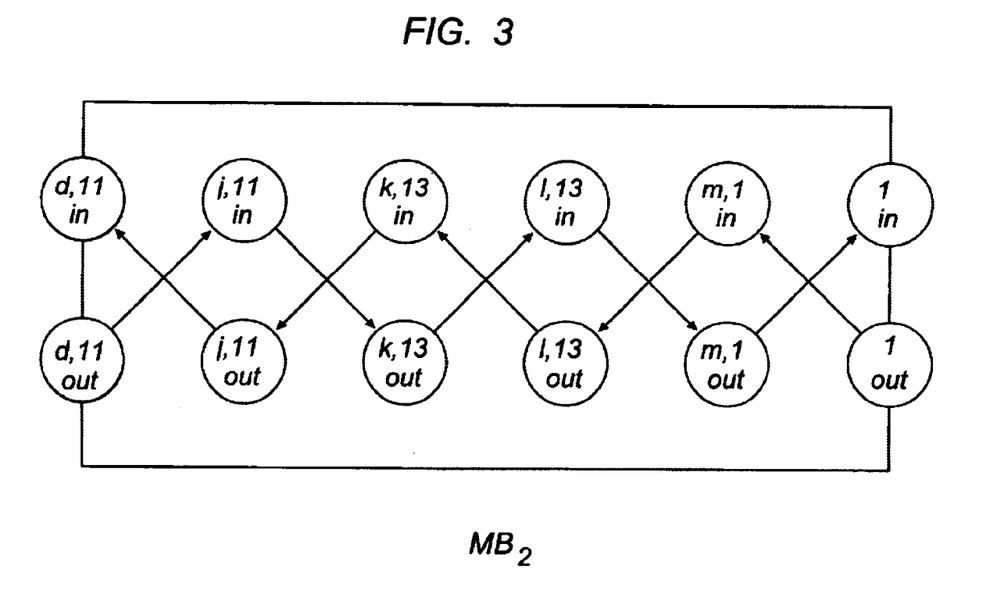
FIG. 3 illustrates a directed graph corresponding to the Mbox model in FIG. 2.

An Mbox model is not a normal directed graph, but it can be converted to a directed graph by means of the following three-step transformation. FIG. 3 shows a directed graph corresponding to an Mbox model. FIG. 3 shows the result of applying the transformation to the model of $MB_2$ in FIG. 2.

(1) Replace each node with two nodes, one with the additional label in and one with the additional label out. If the Dchannel termination has a Dport, these directions should be interpreted with respect to the Dbox to which the Dport belongs. If the Dchannel termination has no Dport, these directions should be interpreted with respect to the relevant device or resource.

(2) Replace each Dlink from Dchannel termination $t_1$ to Dchannel termination $t_2$ by a directed edge from $(t_1, in)$ to $(t_2, out)$.

(3) Replace each Dchannel between Dchannel termination $t_1$ and Dchannel termination $t_2$ by a directed edge from $(t_1, out)$ to $(t_2, in)$ and a directed edge from $(t_2, out)$ to $(t_1, in)$.

The significance of the directed graph is that it defines media flow straightforwardly. At any instant, the media output at Mport $m_1$ should be the sum of the inputs of all the Mports $m_2$ such that Mport $m_1$ is allocated to Dchannel termination $t_1$, Mport $m_2$ is allocated to Dchannel termination $t_2$, and $(t_2, in)$ is a predecessor of $(t_1, out)$. This is well-defined even if the directed graph has cycles, which is a possibility. It may prove appropriate to store Mbox models in the directed-graph form of FIG. 3, rather than in the more compact domain-specific form of FIG. 2. It would then be possible to compute Mbox outputs using previously developed graph algorithms. In the signaling layer, external Dchannels are created by provisioning operations. The media layer must have corresponding provisioning operations to put external Dchannels into the models of the Mboxes assigned to their interface Dboxes.

B. Mbox Model Commands

There are six commands that express all the manipulations of a particular media that a Dbox can perform by itself. These commands open and close Dchannels and Dlinks. By issuing these commands to its Mbox, the Dbox ensures that the Mbox will create representations of the correct Dchannels and Dlinks in its model, and will, in fact, implement them. Dchannel terminations in the models and Mcalls in the implementation are both manipulated as part of the semantics of these commands. A Dbox issues a sequence of commands to its Mbox, and must wait for the reply to each command (either ack or nack) before sending another command. The sequence of commands executed by an Mbox is an interleaving of commands from the various Dboxes to which it is assigned.

For each command, a discussion is provided of its arguments, which Dbox issues it, and how the Dbox gets the argument information. For each command, a precondition and postcondition is also given. The precondition states what must be true for the command to be considered executable. As explained above, if the precondition is not satisfied then the command is ignored and acknowledged to the Dbox as if it had been successful. The postcondition states the effects of executing the command on the Mbox model and Mcalls. As further explained below, if all these effects cannot be achieved, any partial effects are reversed, and a negative acknowledgment is sent to the Dbox or a fault manager.

The command openlink (db: Dbox, from: Dchannel_termination, to: Dchannel_termination)

is issued by a Dbox to add a Dlink between two of its own Dchannel terminations. For the command to be executable, the Dports of the Dchannel terminations must be distinct. Also, there cannot already be a Dchannel joining the same two Dports, or a Dlink joining the same two Dchannel terminations in the same direction. Also, at least one of the Dchannel terminations must already exist in the model. The effect of the openlink command is to add to the model a Dlink from the from argument to the to argument. If one of the two Dchannel terminations does not already exist in the model, it is added.

The command close link (db: Dbox, from: Dchannel_termination, to : Dchannel_termination)

is issued by a Dbox to remove a Dlink between two of its own Dchannel terminations. For the command to be executable, the Dlink must exist. The effect of the command is to remove the Dlink. Also, if this leaves a Dchannel termination in the model unconnected to anything, then that Dchannel termination is removed as well.

The commands open2link (db:Dbox, ct1: Dchannel_termination, ct2: Dchannel_termination)

close2link (db:Dbox, ct1: Dchannel_termination, ct2: Dchannel_termination)

are not strictly necessary, as their effects could be achieved by openlink and closelink, but they handle a common case more conveniently. The open2 link command is just like the open1 ink command except that it opens two Dlinks between the two Dchannel terminations, one in each direction (if one of the two Dlinks already exists, then the command is considered executable, but only the nonexistent Dlink is added). The close2 link command is just like the closelink command except that it closes two Dlinks between the two Dchannel terminations, one in each direction (if only one of the two Dlinks still exists, then the command is considered executable, but only the existent Dlink is removed).

The command openchan (db: Dbox, mb1: Mbox, ct1: Dchannel_termination, mb2: Mbox, ct2: Dchannel_termination)

is issued by a Dbox to open a Dchannel. The Dbox has received an open in the signaling layer (actions and constraints in the signaling layer are discussed further below). The open signal must be augmented with two additional arguments mb: Mbox, in which the sending Dbox sends its assigned Mbox for the medium being opened, and ct: Dchannel_termination, in which the sending Dbox sends the termination for its end of the Dchannel. The receiving Dbox assembles the openchan command using its own Mbox and Dchannel termination for mb1 and ct1, and the received Mbox and Dchannel termination for mb2 and ct2. For the openchan command to be executable in the Mbox that receives it, the two Dchannel terminations must have distinct Dports and the same Dchannel identifier. Also, neither Dchannel termination can already be touching a Dchannel. Also, the two Dports cannot be joined by a Dlink. The effect of the openchan command in the Mbox that receives it is to add a Dchannel to the Mbox model, along with the Dchannel terminations if they are not already present. If the two Mbox arguments are the same, then neither node is a border node, and this is its only effect. If the Mbox arguments are different, on the other hand, then there must be many other effects, some of them side-effects on the Mbox named in mb2. There are several ways to achieve such side-effects. Considering concerns such as ease of Dbox programming, security, and synchronization, the best approach is for Mbox mb1 to achieve them by communicating directly with Mbox mb2 in the media layer. In the model of mb1, ct2 must be a border node. In the model of mb2, the Dchannel between ct1 and ct2 must also appear, with ct1 as a border node. Finally, the Mports allocated to the two border nodes must be joined by an Mcall. Mbox mb1 does not acknowledge the openchan command until all of this has been accomplished successfully.

The command closechan (db:Dbox, ct: Dchannel_termination)

is issued by a Dbox to close a Dchannel. The Dbox has received a close in the signaling layer at the Dport and for the Dchannel identifier combined in the argument ct. For the command to be executable, a Dchannel terminated at ct must exist. The effect of the closechan command in the Mbox that receives it is to remove the Dchannel from the Mbox model, along with either Dchannel termination if it is not touching a link. Also, if any Dlink is left with both Dchannel terminations untouched by Dchannels, then the Dlink is removed. Also, if removal of a Dlink leaves a Dchannel termination untouched by Dlink or Dchannel, then the termination is removed. If neither of the Dchannel terminations of the removed Dchannel is a border node, then these are the only effects. If one of the terminations is a border node, on the other hand, then the Mbox receiving the closechan command must communicate with the Mbox named in the border node to remove the same Dchannel from its model, and to destroy the Mcall associated with it. The Mbox receiving the closechan command does not acknowledge it until all of this has been accomplished successfully.

Instead of issuing a single one of these six commands, a Dbox can also send a sequence of Dlink commands as a unit. The commands are executed in the order given. The sequence must succeed or fail as a unit, so if a command fails, no further commands in the sequence are attempted. Rather, the Mbox undoes the previous commands in the sequence, and sends a nack for the whole.

C. Constraints on Dbox Behavior

Dbox programmers are responsible for the correctness of the media layer, and also for maintaining synchronization between the signaling and media layers. In this section, a discussion is presented of additional constraints on which media commands Dboxes issue, and when they issue them. A Dbox that receives an open signal must issue an openchan command, if and only if it is going to respond to the open with an oack. Furthermore, it must receive an ack from its Mbox for the openchan before responding with the oack. These rules help ensure that the signaling layer "thinks" there is a media channel when and only when there is one.

A Dbox that receives a close signal must issue a closechan command. Furthermore, it must receive an ack from its Mbox for the closechan before responding with the close-ack. These rules also help ensure that the signaling layer "thinks" there is a media channel when and only when there is one.

If there is a race between two close signals in the signaling layer, then two closechan commands will be issued for the same Dchannel. Recalling that a redundant operation on an Mbox model is simply ignored and regarded as successful, this should not cause any problems.

For an openlink command to be executable, at least one of its Dchannel terminations must already exist in the model. A box programmer should take care that all his openlink commands are issued only when they are executable.

Apart from this, a Dbox has no built-in obligations whatsoever concerning Dlink commands. It simply issues the Dlink commands it needs to perform its function. In particular, the model constraints and command pre/postconditions are designed so that no garbage is left over if a Dbox dies with Dlinks left in the model.

It is advantageous that the media layer be fast as well as correct. This also can be influenced by Dbox programming. The point may be illustrated by showing a fast form of transparent media behavior, in which a Dbox continues a media channel without attempting to affect it in any way. In this example, the possibility of resource failures is not considered. If a Dbox is behaving transparently with respect to a media channel, it will definitely be delegating this form of exception handling to a fault manager. The key issue in this example is easy to see from the rule "A Dbox that receives an open signal must issue an openchan command, if and only if it is going to respond to the open with an oack." How does a transparent Dbox know how it is going to respond to its incoming open until it receives a response to its outgoing open from downstream? For purposes of faster media setup, the Dbox can assume that the media channel will be required, and eagerly issue the openchan before knowing this for sure.

Figure 4:
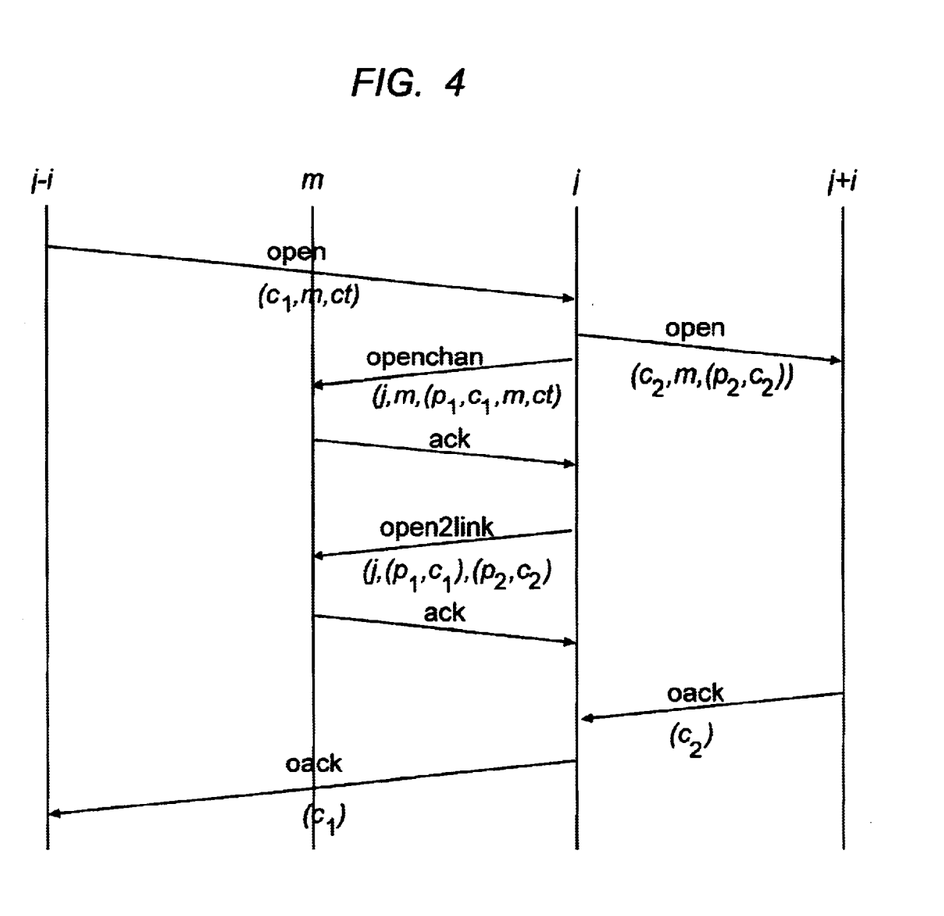
FIG. 4 illustrates a way of achieving transparent media behavior, in accordance with a preferred embodiment of the present invention.

Consider a Dbox j with callee port $p_1$ and caller port $p_2$. The successful case is shown in the message-sequence chart of FIG. 4, where Dbox j is a process along with its predecessor in the usage j−1 and its successor in the usage j+1. There is also a process for the Mbox m assigned to all three Dboxes (the sharing is just for convenience—the point of this example would not change if the Dboxes had different Mboxes). In FIG. 4 the original open arrives at port $p_1$ of j with channel identifier $c_1$. Dboxj immediately propagates the open, choosing channel identifier $c_2$ to prevent glare. Thenj immediately issues the two media commands to implement the section of the media channel that it controls. In doing this, it is assuming that it is going to respond to its incoming open with an oack. The assumption proves correct, because its outgoing pen receives an oack in return. Dbox j does not send its oack upstream until it has received both an oack from downstream in the usage and an ack from m for its final media command.

Figure 5:
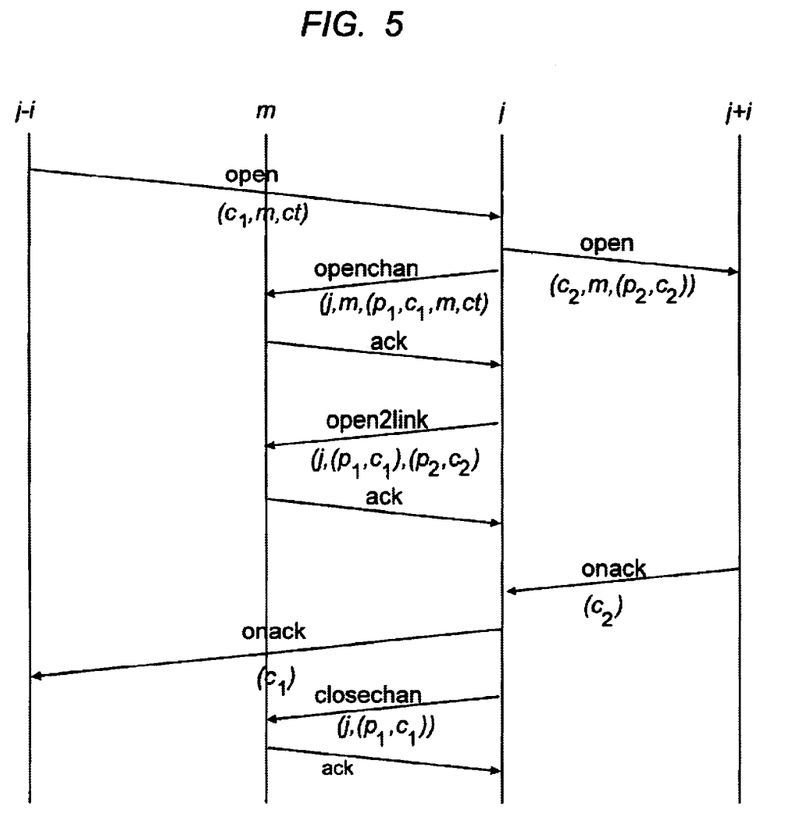
FIG. 5 illustrates recovery after a fast way of achieving transparent media behavior goes wrong.

FIG. 5 shows what must happen when the eager, optimistic assumption proves false. On receiving onack from downstream, Dbox j first propagates it upstream to minimize end-to-end signaling delay. Dbox j then issues a closechan command to close the Dchannel that it erroneously opened. Note that it is not necessary for j to issue a close2link command, because the closing of the Dchannel will remove the Dlinks from the model automatically. Note also that it is safe to send the onack before sending the closechan or receiving an ack of it, because there is no possibility that an end-to-end media channel can exist, even transiently.

D. Modest Optimization

In FIG. 1, the input media stream at Mport p is not being used for anything, as can be seen from the fact that p does not appear in the output set of any Mport of $MB_1$. In this case, $MB_1$ can signal to $MB_2$ to stop transmitting from its Mport q (recall that the identifier of $MB_2$ is stored in the Dchannel termination to which p is allocated). When the situation changes and the input at p is needed once again, $MB_1$ can signal to $MB_2$ to start transmitting. This simple optimization conserves inter-node bandwidth. A mute/unmute signal is ignored if it arrives after the associated Dchannel has been closed.

E. Fault Tolerance

The above describes the interface through which box programmers can express their media-processing intentions and control the media layer from the signaling layer. What should happen in the case of a resource failure in the media layer? On the one hand, the formal definition of DFC assumes a perfect—and perfectly reliable—implementation. The general philosophy of the implementation is to preserve this fiction for the convenience of box programmers. Fault detection and recovery are provided as a service to the fault-tolerant main system.

On the other hand, it has been predicted that bandwidth shortage will be a major source of feature interaction in multimedia telecommunication systems. If this prediction proves true in the IP context, then a few box programmers will want to receive failure reports and to program deliberate resource trade-offs to recover from them. They will not be satisfied with complete abandonment of service, which is likely to be the effect of generic recovery strategies.

The best way to encompass both viewpoints is to allow box programmers to handle exceptions when and only when they want to. In all other cases failures are reported to a fault manager, which is allowed to over-ride box programs as it engages in fault recovery. The programming interface at the media layer can be specified; requests for service can succeed or fail. It can be assumed that other mechanisms not presented here distinguish the requests whose true outcome the programmer wishes to deal with. For all other requests, successes are reported to the requesting box program, while failures are reported to a fault manager which takes over from the blocked box program.

Failure of a media resource that is already in use, i.e., failures not associated with a service request, are always reported to a fault manager. It can be assumed that no box programmer would wish to have control over these situations at the cost of having to program for asynchronous interrupts.

F. Nonsensical commands

It is also possible for the media layer to receive nonsensical commands most commonly, redundant ones. When the media layer receives a nonsensical command, it protects its own integrity by ignoring the command, and keeps the usage progressing by reporting success to the box program that issued it. To see why this is the best strategy for handling nonsensical commands, it is necessary to understand what causes them. One cause is the fact that the signaling and media layers communicate with each other, and within themselves, using distributed protocols. As can be seen, the design of these protocols occasionally leads to redundant commands, which are not harmful or even significant.

The other cause of nonsensical commands is box-programming error. However, designing the media layer to diagnose programming errors would be a poor idea. Because the media layer does not have full information about DFC usages, it cannot detect all programming errors. Furthermore, since it would be unusual for a programmer to program explicit exception handling to deal with his own errors, runtime error detection is not very useful. Far better to rely on static analysis of box programs to eliminate errors before runtime, and to simply design the runtime environment to protect itself from residual errors.

The media implementation of a feature is completely distributable—it can be located anywhere in the network. The only limitation is that the Mbox used by a Dbox must be chosen when the Dbox is created, and cannot be changed afterward. Media switches are not constrained by this scheme, so they can be deployed across the network efficiently. The technique illustrated in FIGS. 4 and 5 allows segments of the media path to be set up in parallel with each other and with some of the signaling. As a result, post-dial setup delay will be determined mainly by delay in the signaling layer. It appears that the efficiency of this scheme depends a great deal on how Mboxes are assigned to Dboxes. In some cases it is obvious—line interfaces and feature boxes in the source and target zones of their addresses should all be given Mboxes on the line's access node—but in many other cases it is not. It should be noted that at the time a free Dbox is created, the Mbox assignments of other Dboxes already in the usage can be taken into account.

G. Media Transparency

Figure 6:
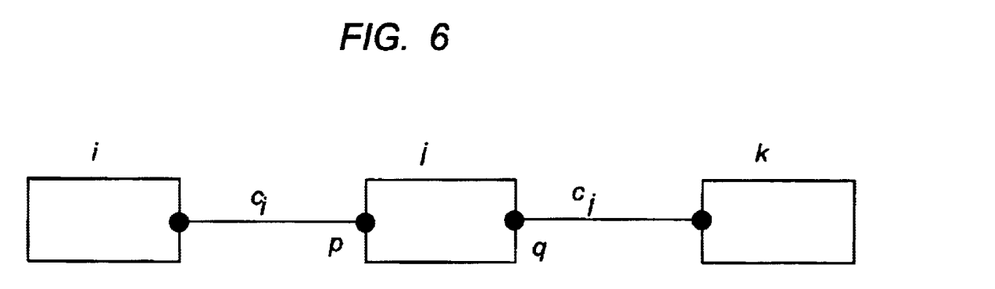
FIG. 6 is a fragment of a DFC usage used to illustrate media transparency.
Figure 7:
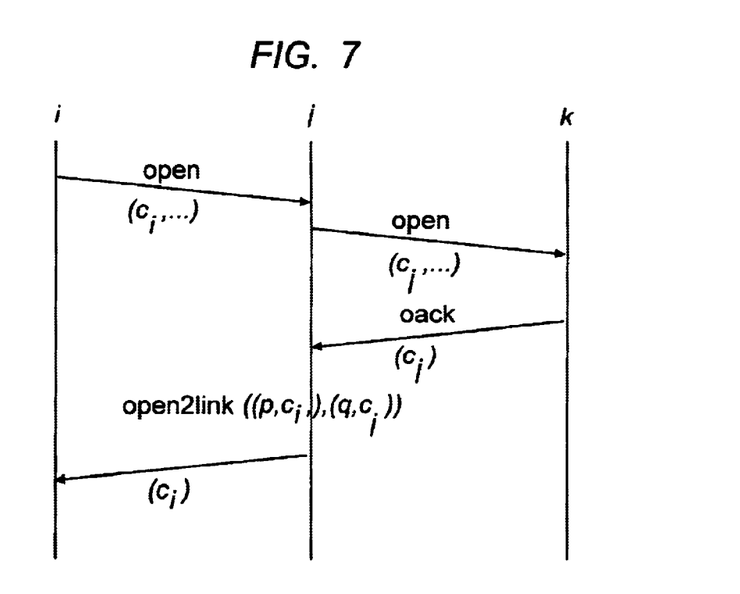
FIG. 7 is a message-sequence chart illustrating transparent opening behavior, in the successful case.

"Transparency" is behavior of a Dbox with respect to an open signal it receives. In media transparency, the Dbox cooperates to continue the end-to-end media channel, without attempting to affect it in any way. Consider the usage fragment shown in FIG. 6. Dboxes i, j, and k are connected by Dcalls. Dbox j has at least ports p and q. Dbox i sends an open signal that j receives on channel $c_i$ at port p. Dbox j behaves transparently with respect to this open. The initial portion of its behavior is shown in FIG. 7. First j chooses a continuation Dport q and a Dchannel identifier $c_j$ within the Dcall from q. Next j propagates the open signal through $c_j$ at q. Dbox j must be starting with a "clean slate," meaning that it has no pre-existing Dlinks concerning Dchannel terminations (p, $c_i$) or (q, $c_j$). It is already known that neither $c_i$ nor $c_j$ has been used previously to identify a Dchannel within its Dcall.

If the response to the open is an oack signal, then j does whatever is necessary to open a two-way media linkage between Dchannel terminations (p, $c_i$) and (q, $c_j$) within j, and then propagates the oack signal through (p, $c_i$). This is also shown in FIG. 2. If the response to its outgoing open signal is an onack signal, then j merely propagates the onack through (p, $c_i$) without doing any internal linkage, since there is nothing to link. Returning to the successful case, after the behavior of FIG. 7, j does nothing with any of these Dchannels, Dchannel terminations, or Dlinks, except to acknowledge a close signal it receives through (p, $c_i$) or (q, $c_j$), and also to propagate it. The final result of the propagation is that both Dchannels and both Dlinks are gone.

H. Media Bypass

Figure 8:
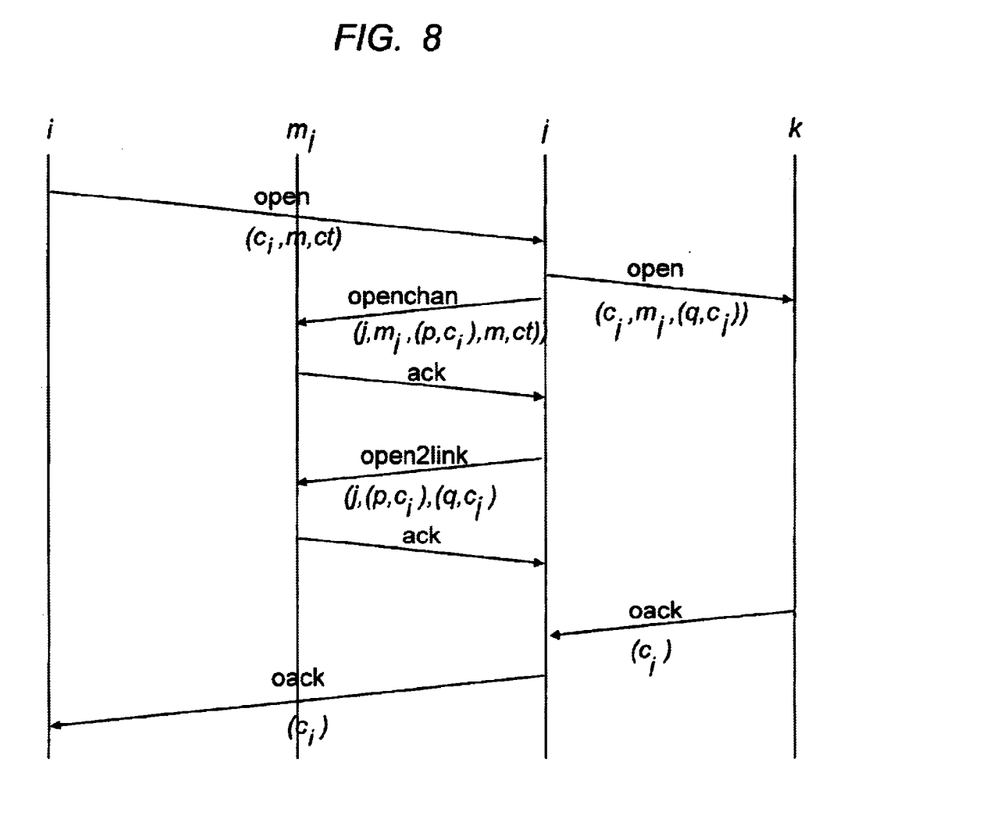
FIG. 8 is a message-sequence chart illustrating transparent opening behavior, in the successful case, with implementation instruction to the media layer.

It was shown above how transparent behavior specified in the signaling layer could be implemented in the media layer. A successful opening is shown in FIG. 8. In comparison to FIG. 7, the open coming in to j has been augmented with an Mbox m and a Dchannel termination ct. The open going out of j has been augmented with j's own Mbox m j and the new Dchannel termination (q, $c_j$). Dbox j also issues commands openchan(j, $m_j$,(p, $c_i$), m, ct) and open2link(j, (p, $c_i$), (q, $c_j$)) to its own Mbox $m_j$, so that the Mbox will implement the Dchannel between i and j and the Dlinks between p and q. Since the Mbox commands are issued before the outcome of the outgoing open is known, they must be reversed by the Dbox if the outcome is onack. If the Mbox fails in any way to carry out the commands, the exception is handled by a fault manager, without the participation of Dbox j.

Figure 9:
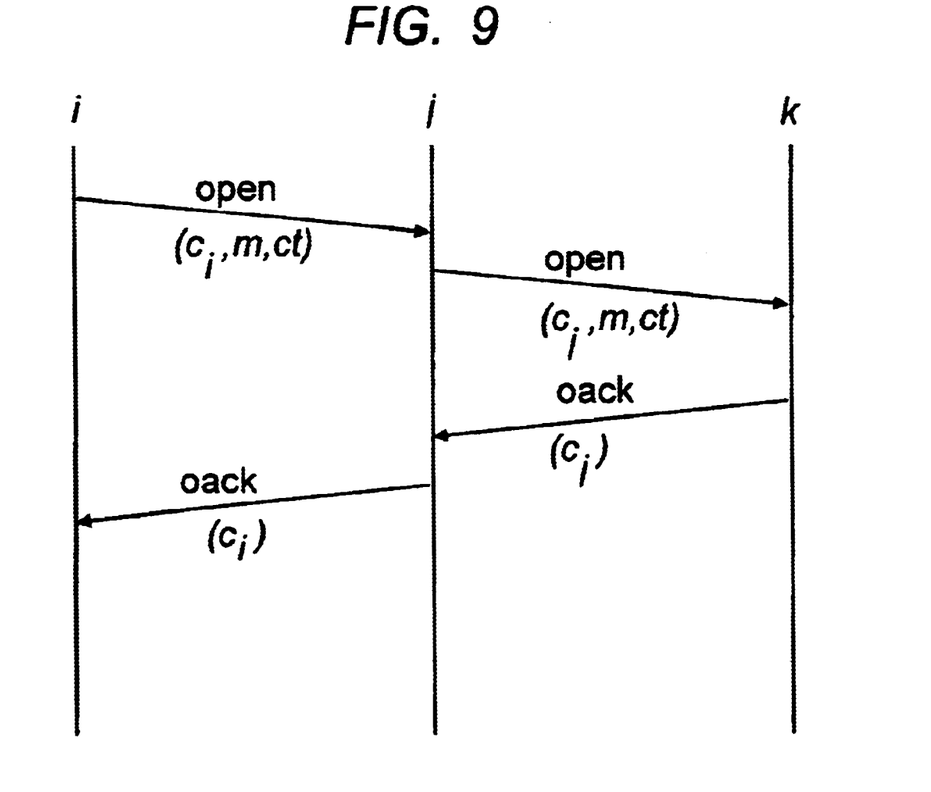
FIG. 9 is a message-sequence chart illustrating transparent opening behavior, in the successful case, implemented with media bypass.

FIG. 8 is not the only possible way to implement j's transparent behavior as specified in the signaling layer. Another valid implementation technique is "media bypass," as illustrated in FIG. 9. With media bypass, Dbox j issues no commands whatsoever to its Mbox. It merely copies the Mbox m and Dchannel termination ct mentioned in the incoming open to the outgoing open, so that the resulting media channel will have ct in m as its endpoint. Note that ct might be in Dbox i, or, if i also did a media bypass, in some other Dbox to the left of i. If the open results in an onack, or if the media channel is later closed,j does absolutely nothing except propagate the Dcall signals.

Media bypass, when applicable, has many practical advantages. Firstly, the code for j is simpler. Secondly, the model in $m_j$ is simpler, as no trace of j's participation in this media channel ever appears there. If j uses media bypass for all channels of a particular medium, then it need have no assigned Mbox at all for that medium. Most important of all, it might prevent an unnecessary hairpin of the media channel through $m_j$. Dbox j's bypass will prevent a hairpin whenever (1) the true endpoints of the media channel are outside $m_j$, and (2) all other Dboxes that participate in the end-to-end media channel and have Mbox $m_j$ assigned to them are also doing media bypass.

Figure 10:
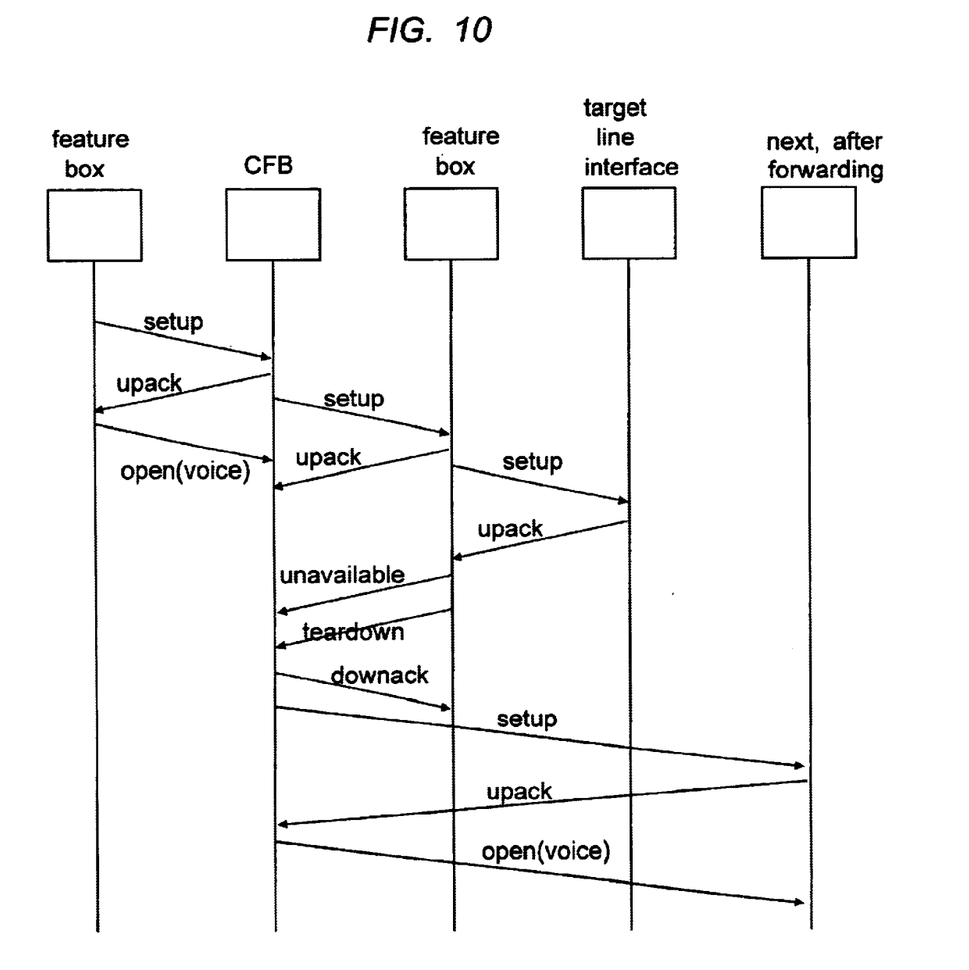
FIG. 10 is a message-sequence chart illustrating how a "call forwarding on busy" feature can utilize media bypass.

It is easy to see that a Call Forwarding Unconditional feature box can use bypass on all media channels. Its only function is to alter the setup signal coming through; all media channels are treated transparently. A Call Forwarding on Busy feature box can also use media bypass, although a bit of care is needed. FIG. 10 shows why. CFB cannot forward any open signal until it has determined the success or failure of its first outgoing call, and made a second outgoing call if necessary. Then it can treat any media channel with complete transparency. If, on the other hand, CFB had forwarded the open (voice) signal immediately, the signal might have encountered a feature box that used voice for its own purposes. This feature box would complete the voice channel back to the caller. Later, when CFB received unavail, it would have to close the portion of the voice channel on its right, and later re-link the voice channel on its left to a new post-forwarding voice channel on its right. This behavior violates the rules of media transparency, so CFB could not use media bypass.

A Call Forwarding on No Answer feature box can never use bypass on the voice channel to which the "no answer" refers. The "no answer" condition is a result of the channel protocol's interaction with a target interface box. Thus, CFNA must forward the open (voice) signal immediately, and cannot use the delaying tactic that CFB uses.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been presented in the context of DFC; however, the principles of the present invention could be extended to other distributed feature architectures. Such an extension could be readily implemented by one of ordinary skill in the art given the above disclosure.

What is claimed is:

1. A telecommunication network system comprising:
   a signaling layer further comprising a plurality of feature modules and interface modules connected by signaling communication channels and means for dynamically assembling the feature modules in a graph that connects interface modules that are participating in a communication usage such that the assembled feature modules implement features for the communication usage; and
   a media layer further comprising a plurality of media-processing modules connected by media channels and wherein each feature and interface module is assigned to a media-processing module.

2. The telecommunication network system of claim 1 wherein the media-processing modules maintain a model of the communication usage.

3. The telecommunication network system of claim 2 wherein the feature and interface modules issue commands to their assigned media-processing modules which update the model of the communication usage.

4. The telecommunication network system of claim 2 wherein the media channels may be summed at a media-processing module and the model of the communication usage may be utilized to compute which media channels are or are not summed and output by the media channel.

5. The telecommunication network system of claim 1 wherein one or more feature modules need not communicate with its assigned media-processing module thereby simplifying processing and avoiding media hairpins.

6. The telecommunication network system of claim 1 wherein a media-processing module may instruct another media-processing module in the media layer to not transmit on a media channel, thereby conserving on bandwidth.

7. The telecommunication network system of claim 1 further comprising a fault manager that handles exceptions arising from insufficient resources in the media layer, where not handled by a feature module.

* * * * *